(12) United States Patent
Teo et al.

(10) Patent No.: US 7,558,980 B2
(45) Date of Patent: Jul. 7, 2009

(54) SYSTEMS AND METHODS FOR THE DISTRIBUTION OF DIFFERENTIAL CLOCK SIGNALS TO A PLURALITY OF LOW IMPEDANCE RECEIVERS

(75) Inventors: Swee Ann Teo, Shanghai (CN); Xiaomin Si, San Jose, CA (US); Larry Wu, Shanghai (CN)

(73) Assignee: Montage Technology Group Limited, Grand Cayman (KY)

( * ) Notice: Subject to any disclaimer, the term of this patent is extended or adjusted under 35 U.S.C. 154(b) by 0 days.

(21) Appl. No.: 11/619,958

(22) Filed: Jan. 4, 2007

(65) Prior Publication Data
US 2008/0165884 A1    Jul. 10, 2008

(51) Int. Cl.
*G06F 1/00* (2006.01)
*H04L 7/00* (2006.01)
*G06F 1/12* (2006.01)

(52) U.S. Cl. .................. 713/500; 713/400; 713/600
(58) Field of Classification Search ............. 713/500, 713/400, 600
See application file for complete search history.

(56) References Cited

U.S. PATENT DOCUMENTS

| | | | |
|---|---|---|---|
| 4,718,083 A | 1/1988 | Boeckmann | |
| 5,124,578 A * | 6/1992 | Worley et al. | 326/34 |
| 5,614,855 A | 3/1997 | Lee et al. | |
| 6,154,498 A | 11/2000 | Dabral et al. | |
| 6,310,495 B1 * | 10/2001 | Zhang | 327/52 |
| 6,433,605 B1 * | 8/2002 | Zhang | 327/291 |
| 6,539,490 B1 * | 3/2003 | Forbes et al. | 713/401 |
| 6,566,926 B1 | 5/2003 | Patterson | |
| 6,665,339 B1 | 12/2003 | Adams et al. | |

OTHER PUBLICATIONS

Edoardo Prete, Dirk Scheideler, Anthony Sanders, "A 100mW 9.6Gb/s Transceiver in 90nm CMOS for Next-Generation Memory Interfaces", ISSCC 2006 / Session 4 / Gigabit Transceivers / 4.5.

* cited by examiner

*Primary Examiner*—Thomas Lee
*Assistant Examiner*—Ji H Bae
(74) *Attorney, Agent, or Firm*—Ivy Y. Mei

(57) ABSTRACT

Systems and methods to distribute clock signals using a common bus. In one embodiment, a clock signal distribution system includes: a bus; a transmitter coupled to the bus to drive a clock signal onto the bus; and one or more receivers coupled to the bus to receive the clock signal, in which the impedance of each receiver is lower than 1000 ohms (or 500 or 200 ohms). In one embodiment, the clock distribution system is on an integrated circuit to distribute the clock on the integrated circuit chip. In one embodiment, the receivers are self-biased; a bias current of the transmitter is a dynamic sum of bias currents of the receivers; and, each of the receivers has a duty cycle correction mechanism. In one embodiment, there is no inductor between the transmitter and the low impedance receiver in the clock distribution system; and the bus has no terminator.

17 Claims, 6 Drawing Sheets

SYSTEMS AND METHODS FOR THE DISTRIBUTION OF DIFFERENTIAL CLOCK SIGNALS TO A PLURALITY OF LOW IMPEDANCE RECEIVERS

FIELD OF THE TECHNOLOGY

At least some embodiments of the invention relate to the distribution of clock signals.

BACKGROUND

Many large-scale integrated chips (ICs) such as microprocessors and advanced memory buffers (AMB) use a global clock as a timing reference to synchronize data and logic operations performed by different functional blocks on the chips.

As new generations of integrated chips (ICs) become faster and larger, it becomes more and more difficult to distribute the global clock signal to the functional blocks on an IC chip with minimum clock skew.

In addition, a clock distribution system for a high frequency global clock consumes more power as the frequency of the clock increases. When the frequency of the global clock increases, the wires for distributing the global clock across a large-scale IC chip dissipate more power, which can lead to performance degradation.

Furthermore, a traditional clock distribution network occupies lots of routing area, which may result in the need for a larger die size.

For example, FIG. 1 illustrates a prior art method of distributing clock signals using point to point connections. Such a clock distribution scheme uses employ point to point network topology, as shown in FIG. 1. For example, in FIG. 1, a clock source (11), such as a centralized Phase Lock Loop (PLL), generates a clock signal, which is provided to various functional blocks (e.g., 21, 23, . . . , 29) on an integrated circuit chip (13) as the global timing reference. Typically, the clock signal is distributed from the clock source (11) to each functional block (e.g., 21) through a differential wire pair, which provides the point to point connection from the clock source (11) to the corresponding function block (e.g., 21).

In FIG. 1, the use of a centralized clock source (e.g., PLL) can lead to reduced power consumption and less die size, when the clock distribution system is compared with a system that has distributed Phase Lock Loops (PLLs).

However, as the clock frequency increases, the distribution of a clock from a centralized source to function blocks on a large silicon die becomes increasingly difficult due to clock skew. Further, the clock distribution network may suffer from a large capacitive load which may cause high power consumption for clock distribution. Furthermore, as the number of functional blocks within an IC chip increases, the routing of the wires for the clock distribution network becomes more complicated; and the clock distribution network may occupy a larger die area due to the point to point connections.

FIG. 2 illustrates a prior art method of distributing clock signals using high impedance receivers in a daisy-chained clock distribution system. In FIG. 2, the global clock is distributed to a set of functional blocks (31, 33, . . . , 39) via a daisy chain that is terminated with a terminator (55). High impedance receivers (e.g., 41, 43, . . . , 49) are used on the daisy chain to receive the clock signal for the respective functional blocks (e.g., 31, 33, . . . , 39). The impedance receivers typically have impedance above 10 K ohms. An inductor (e.g., 53) is used between the transmission line (e.g., 51) and high impedance receiver (e.g., 41). Further details on such a clock distribution system can be found in "A 100 mW 9.6 Gb/s Transceiver in 90 nm CMOS for Next-Generation Memory Interfaces," by Edoardo Prete, Dirk Scheideler and Anthony Sanders, in ISSCC 2006, SESSION 4, GIGABIT TRANSCEIVERS, 2006 IEEE International Solid-State Circuits Conference, pp. 88-89 and 640.

In the clock distribution system illustrated in FIG. 2, some power is wasted on the resistive termination load on the terminator (e.g., 55). Further, the clock distribution network may occupy a large die area due to the used of transmission lines (e.g., 51) and inductors (e.g., 53).

SUMMARY OF THE DESCRIPTION

Systems and methods to distribute clock signals using a common bus. Some embodiments are summarized in this section.

In one embodiment, a clock signal distribution system includes: a bus; a transmitter coupled to the bus to drive a clock signal onto the bus; and one or more low impedance receivers coupled to the bus to receive the clock signal. For example, the impedance of the receiver is less than 1000 ohms (or 500 or 200 ohms).

In one embodiment, the bias current of the transmitter is controlled by bias currents of receivers coupled to the bus. For example, the bias current of the transmitter is a dynamic sum of the bias currents of the receivers coupled to the bus.

In one embodiment, the bus includes a differential bus. The low impedance receiver includes a pair of current sources coupled to a pair of self-biased gates to receive the differential clock signal. For example, the gates can be biased via a common mode feedback circuitry based on outputs of the gates. In one embodiment, the common mode feedback circuitry also performs duty cycle correction.

In one example, the common mode feedback circuitry includes a comparator to determine a difference between a filtered version of an output of the clock signal and a reference voltage. The output of the comparator is filtered with a capacitor to generate a bias voltage for the self-biased gates.

In one embodiment, the clock distribution system is on an integrated circuit to distribute the clock to different portions of the integrated circuit chip.

In one embodiment, there is no inductor between the transmitter and the low impedance receiver in the clock distribution system. In one embodiment, the bus has no terminator.

In one embodiment, an integrated circuit, includes: a plurality of blocks of circuits, each of the blocks including a receiver having an impedance less than 500 ohms; a bus to connect the receivers of the blocks; and a transmitter coupled to the bus to drive a clock signal through the bus to the receivers. In one embodiment, the receivers are self-biased; and a bias current of the transmitter is a dynamic sum of bias currents of the receivers. In one embodiment, each of the receivers has a duty cycle correction mechanism.

In one embodiment, an apparatus includes: a differential bus; a differential transmitter coupled to the bus to drive a clock signal onto the bus; a plurality of circuits; and a plurality of receivers coupled to the bus to receive the clock signal for the plurality of circuits respectively; wherein each of the receivers having an impedance less than 200 ohms. In one embodiment, there is no inductor between the transmitter and the receivers; and the bus has no terminator.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION OF THE DRAWINGS

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

One embodiment of the invention provides a high-speed, multi-drop and self-biased clock distribution system for high-speed and large-scale integrated circuits (ICs). Such a clock distribution system can have reduced power consumption, less routing area, and reduces clock skew, when compared with conventional clock distribution systems.

Figure 1:
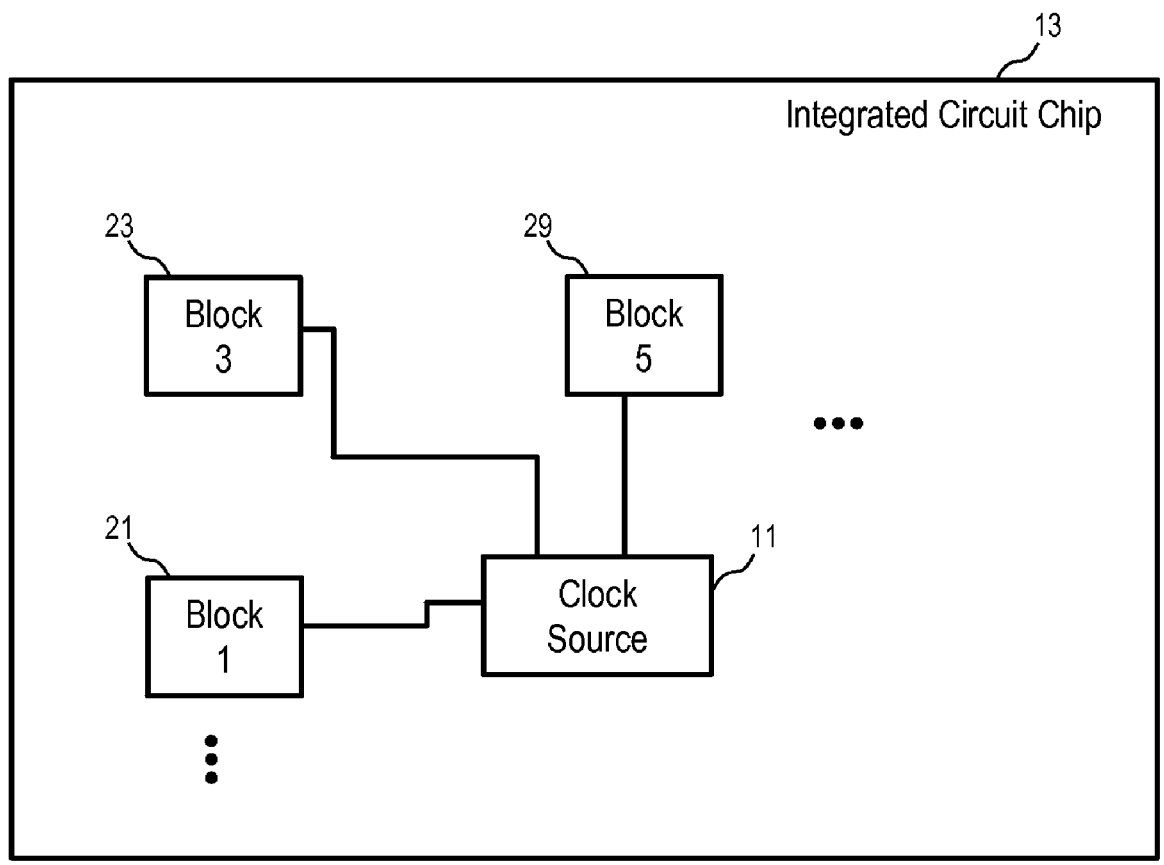
FIG. 1 illustrates a prior art method of distributing clock signals using point to point connections.
Figure 2:
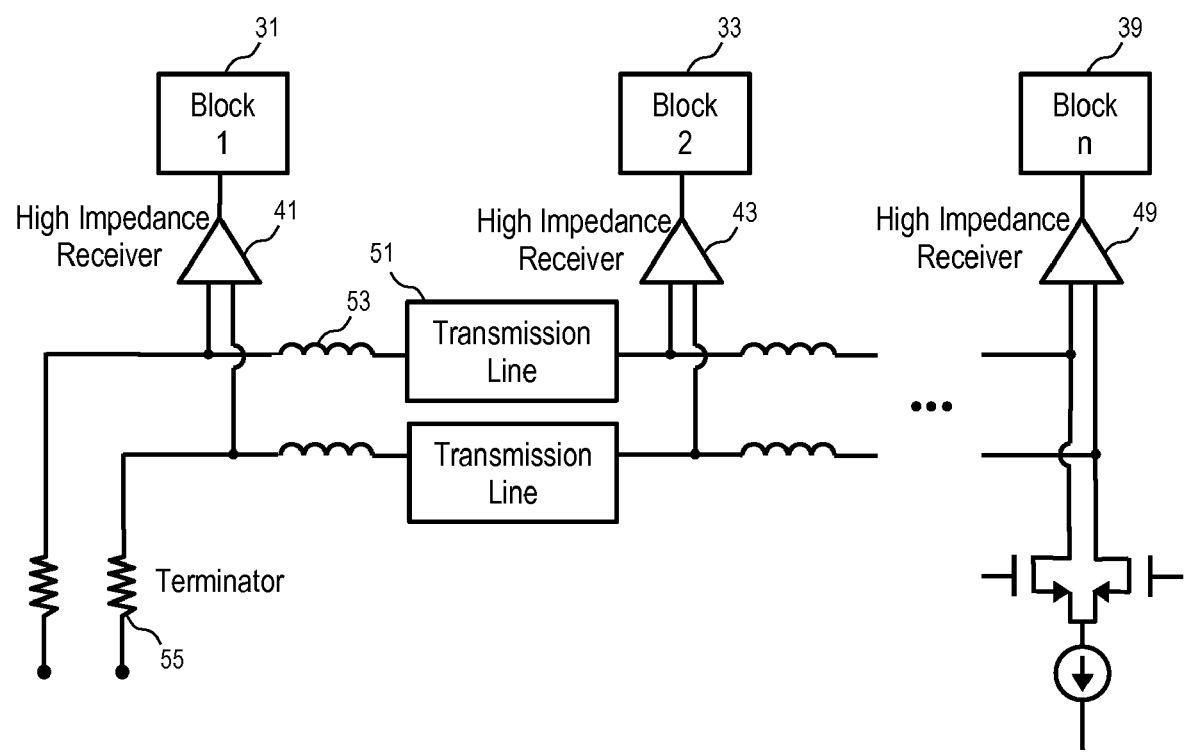
FIG. 2 illustrates a prior art method of distributing clock signals using high impedance receivers in a daisy-chained clock distribution system.
Figure 3:
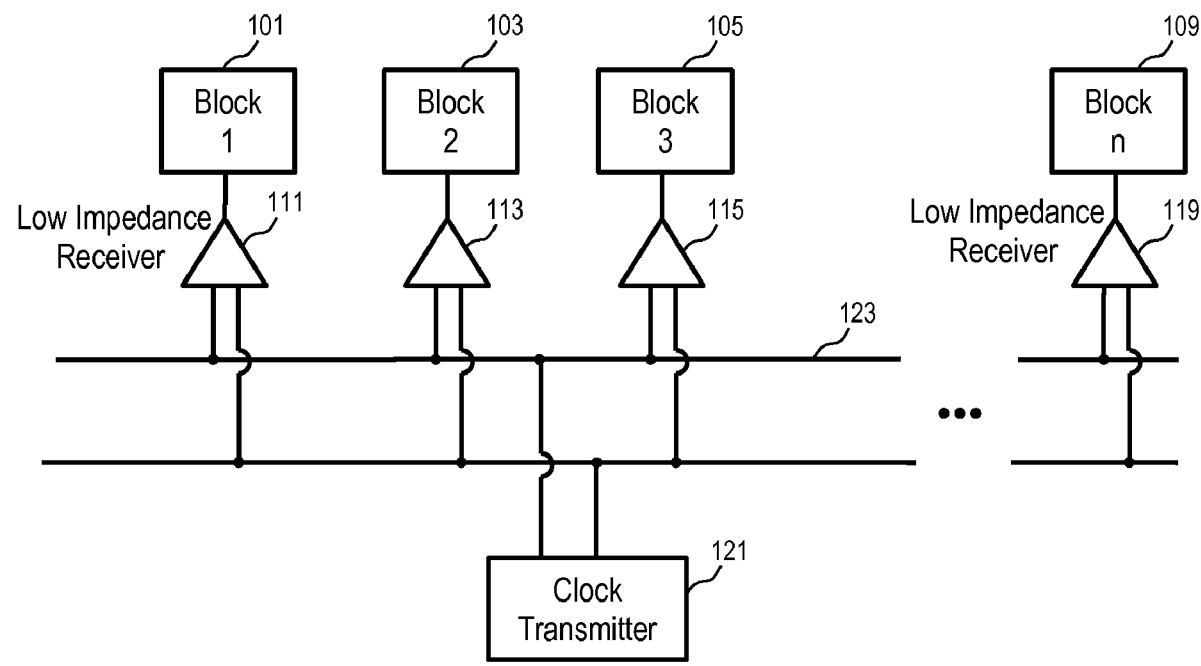
FIG. 3 illustrates a clock distribution system according to one embodiment of the invention.

FIG. 3 illustrates a clock distribution system according to one embodiment of the invention. In FIG. 3, a multi-drop differential bus (123) is used to distributed the clock signal from a centralized source to a plurality of circuit blocks (e.g., 101, 103, 105, . . . , 109). Low impedance receivers (e.g., 111, 113, 115, . . . , 119) are used to receive the clock signals from the differential bus (123) at the desired locations. In FIG. 3, the differential bus (123) is a two-wire common bus.

In the system of FIG. 3, there is no need for a terminator; and there are no inductors between the low impedance receivers (111, 113, . . . , 119) and the clock transmitter (121).

In one embodiment, the impedance of the receivers (e.g., 111, 113, 115, . . . , 119) is lower than 1000 ohm (or 500 ohm). Preferably, the impedance of the receivers (e.g., 111, 113, 115, . . . , 119) is lower than 200 ohm.

For example, a centralized Phase Lock Loop (PLL) can be used to generate a global clock signal, which can be driven onto the common bus (123) by the clock transmitter (121) for distribution to the circuit blocks (101, 103, 105, . . . , 109). The common bus is routed across the chip; and each circuit block that needs the global clock can tap into the common bus at an appropriate position. In one embodiment, a low impedance receiver of a circuit block can dynamically coupled to the common bus whenever the global clock is needed.

Thus, according to embodiments of the invention, the routing area occupied by the clock distribution network can be greatly reduced; and the power consumption can also be lowered down.

In one embodiment, the clock distribution system as illustrated in FIG. 3 is implemented on a single integrated circuit chip for the distribution of a global clock signal to circuit blocks on the IC chip. For example, the clock distribution system can be used on an IC chip for a microprocessor or for an advanced memory buffer (AMB). Alternatively or in combination, the clock distribution system can also be used to distribute a global clock signal across multiple IC chips.

Figure 4:
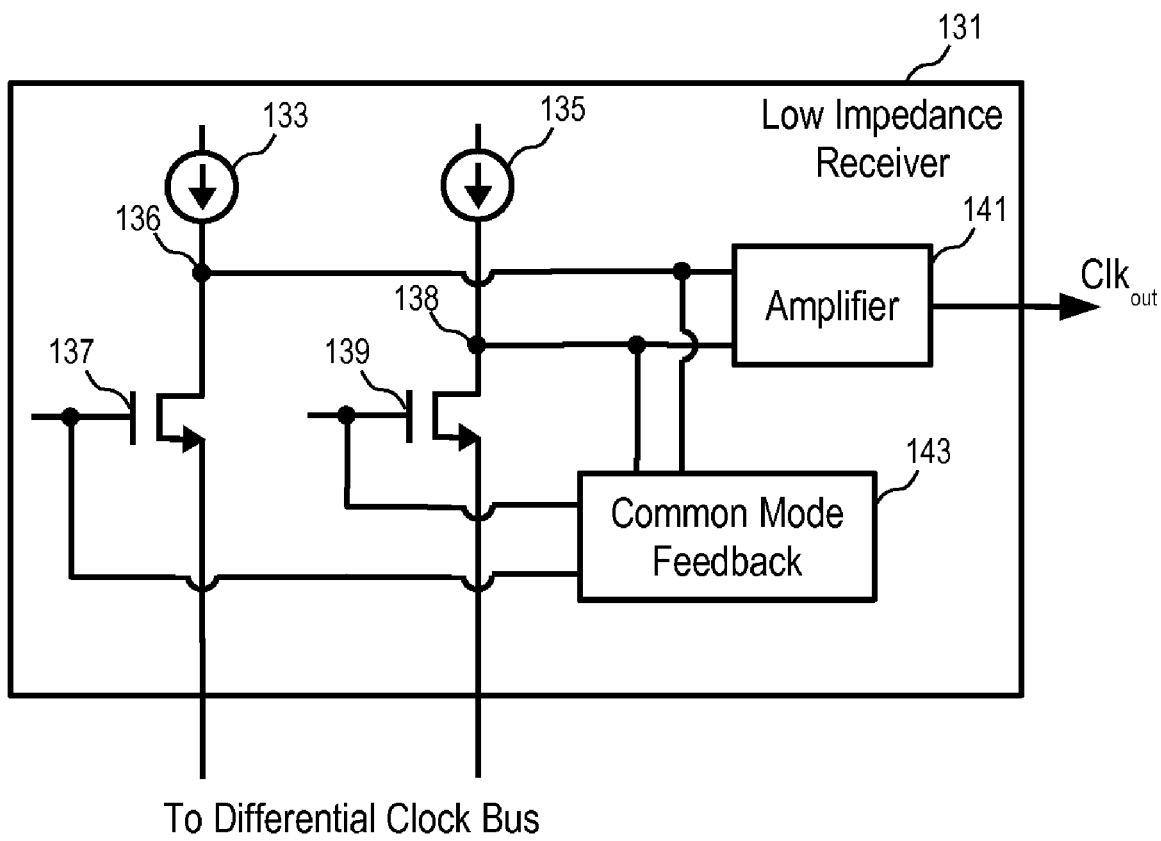
FIG. 4 illustrates a low impedance receiver for a clock distribution system according to one embodiment of the invention.

FIG. 4 illustrates a low impedance receiver for a clock distribution system according to one embodiment of the invention. In FIG. 4, the low impedance receiver (131) obtains the differential input signal from the differential clock bus (e.g., 123 of FIG. 3).

The low impedance receiver (131) includes current sources (133 and 135) coupled to the self-biased gates (137 and 139). The currents from the current sources (133 and 135) are selectively directed onto the differential bus by the gates (137 and 139) based on the outputs (136 and 138) of the self-biased gates (137 and 139).

In FIG. 4, the common mode feedback (143) is used to select one of the gates (137 and 139) to have the bias voltage to remain open. Thus, one of the currents from the current sources (133 and 135) is directed onto the differential bus, while the other is not. Thus, the clock receiver is a low impedance load tapped on the differential bus.

In FIG. 4, the amplifier (141) is used to generate the output clock signal $Clk_{out}$, based on the outputs (136 and 138) of the self-biased gates (137 and 139).

Figure 5:
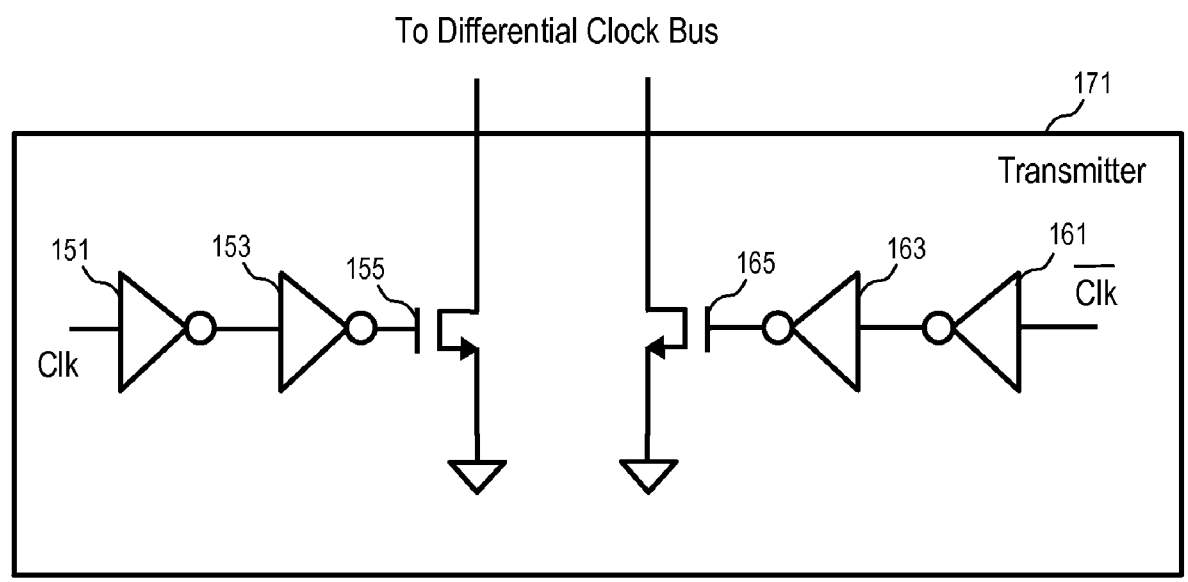
FIG. 5 illustrates a clock transmitter for a clock distribution system according to one embodiment of the invention.

In one embodiment, the bias current of a clock transmitter is controlled by the current driven onto the bus by the clock receivers, such as a clock transmitter illustrated in FIG. 5 for a clock distribution system according to one embodiment of the invention.

In FIG. 5, the transmitter (171) drains the current from the differential bus (e.g., 123 of FIG. 3) based on the differential clock signal ($Clk/\overline{Clk}$) to be transmitted over the differential bus. For example, the clock signal ($Clk/\overline{Clk}$) can be amplified via inverters (e.g., 151, 153 and 161, 163) to control the bias of the gates (155 and 165).

In FIG. 5, the gate (155) of the transmitter periodically switches on and off to drain the current from one wire of the differential bus, while the gate 165 of the transmitter periodically switches off and on respectively to drain the current from the other wire of the differential bus.

Thus, the total amount of bias current in the transmitter is the dynamic sum of the current required by the receivers. When the receivers drive more current onto the bus, the transmitter drains more automatically. Thus, a receiver can be dynamically coupled to, or disconnected, from the bus without affecting the performance of the system.

In one embodiment, since each receive is self-biased, as illustrated in FIG. 4, the clock distribution system is insensitive to the mismatch in bias current among the receivers.

In one embodiment, the gates (155 and 165) are implemented using NMOS gates.

Figure 6:
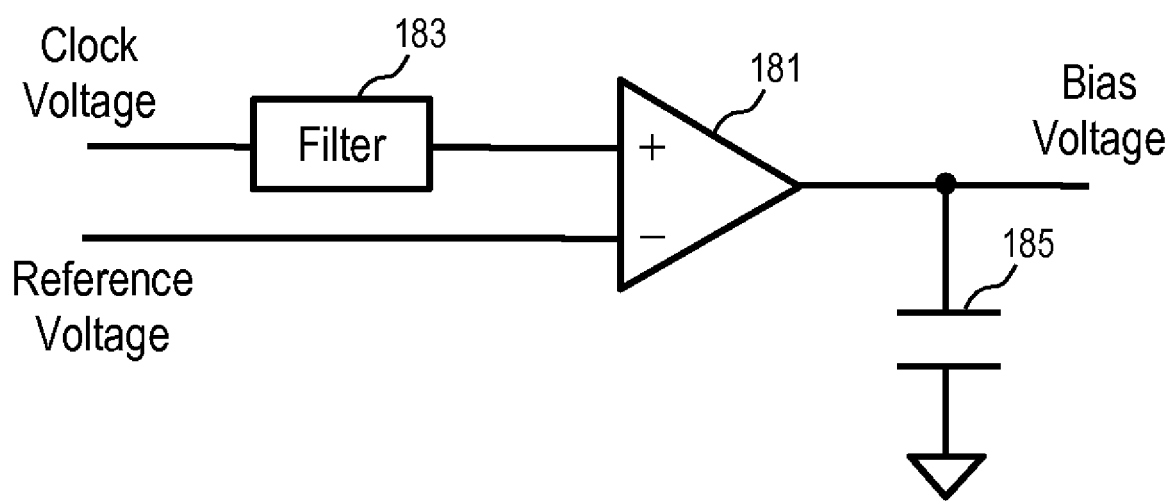
FIG. 6 illustrates a circuitry to provide a bias voltage for a low impedance receiver according to one embodiment of the invention.

FIG. 6 illustrates a circuit to provide a bias voltage for a low impedance receiver according to one embodiment of the invention. In FIG. 6, the clock voltage (e.g., at the output 136 of gate 137 in FIG. 4) is filtered by a filter (183) for comparison with a reference voltage. The comparator (181) generates an output based on the difference between the filtered version of the clock voltage and the reference voltage. The output of the comparator is filtered using a capacitor (185) to generate the bias voltage (e.g., for gate 137 in FIG. 4).

In one embodiment, the bias voltage for one gate (e.g., 137) of the receiver is such that when the clock voltage is higher than the reference voltage, the bias voltage is to close the gate, and when the clock voltage is lower than the reference voltage, the bias voltage is to open the gate. The bias voltage for the other gate (139) of the receiver operates in the opposite mode (e.g., when the clock voltage is higher than the reference voltage, the bias voltage is to open the gate; and when the clock voltage is lower than the reference voltage, the bias voltage is to close the gate). Thus, the bias circuitry is configured to reject the common mode in the output of the gates (e.g., 137 and 139) of a receiver.

In FIG. 6, the bias voltage generator also performs duty cycle correction (e.g., via the filters). ??IF POSSIBLE PLEASE ELABORATE ON THE DCC MECHANISM?? Due to the duty cycle correction mechanism, the receiver is insensitive to the mismatch between the currents from the current sources (e.g., 133 and 135) of a low impedance receiver (e.g., 131 of FIG. 4).

Thus, in one embodiment, the CMFB (Common Mode Feedback) block is designed to generate the bias voltages to self-bias the receivers and to correct the duty cycle.

Thus, at least one embodiment of the invention provides a point to multi-point clock distribution system, which may use transmission line or lossy line. In one embodiment, the clock distribution system uses low impedance receivers but no terminators. The clock distribution system does not use inductors between a transmission line and a receiver.

Compared to traditional clock distribution systems, a system and method according to one embodiment of the invention has a number of advantages, such as low signal swing which leads to low power consumption on the clock distribution system, less sensitive to capacitive loading due to the use of low impedance receivers, less sensitive to mismatch in resistance of routing channel and in bias current due to the self-bias mechanism, smaller die area used for routing the clock distribution wires, etc. In one embodiment, each clock receiver provides a low impedance transmission load which reduces power consumption.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A clock signal distribution system, comprising:
   a differential bus to concurrently interface a plurality of receivers;
   a transmitter coupled to the differential bus to drive a differential clock signal onto the differential bus; and
   a low impedance receiver coupled to the differential bus to receive the clock signal;
   wherein the low impedance receiver comprises a pair of current sources coupled to a pair of self-biased gates to receive the differential clock signal; and
   wherein the gates are biased via a common mode feedback circuitry based on outputs of the gates.

2. The system of claim 1, further comprising:
   one or more further low impedance receiver coupled to the bus to receive the clock signal;
   wherein the bus comprises a multi-drop differential bus.

3. The system of claim 1, wherein a bias current of the transmitter is controlled by bias currents of receivers coupled to the bus.

4. The system of claim 1, wherein the bias current of the transmitter is a dynamic sum of the bias currents of the receivers coupled to the bus.

5. The system of claim 1, wherein the impedance of the low impedance receiver is less than 1000 ohms.

6. The system of claim 1, wherein the impedance of the low impedance receiver is no more than 200 ohms.

7. The system of claim 1, wherein the common mode feedback circuitry performs duty cycle correction.

8. The system of claim 7, wherein the common mode feedback circuitry comprises a comparator to determine a difference between a filtered version of an output of the clock signal and a reference voltage.

9. The system of claim 8, wherein an output of the comparator is filtered with a capacitor to generate a bias voltage for the self-biased gates.

10. The system of claim 1, wherein the system is implemented on an integrated circuit.

11. The system of claim 1, wherein there is no inductor between the transmitter and the low impedance receiver.

12. The system of claim 1, wherein the bus has no terminator.

13. An integrated circuit, comprising:
    a plurality of blocks of circuits, each of the blocks comprising a receiver having an impedance less than 500 ohms;
    a differential bus to connect the receivers of the blocks; and
    a transmitter coupled to the differential bus to drive a differential clock signal through the differential bus to the receivers;
    wherein each of the receivers comprises a pair of current sources coupled to a pair of self-biased gates to receive the differential clock signal; and
    wherein the gates are biased via a common mode feedback circuitry based on outputs of the gates.

14. The integrated circuit of claim 13, wherein the receivers are self-biased; and a bias current of the transmitter is a dynamic sum of bias currents of the receivers.

15. The integrated circuit of claim 14, wherein each of the receivers has a duty cycle correction mechanism.

16. An apparatus, comprising:
    a differential bus;
    a differential transmitter coupled to the bus to drive a differential clock signal onto the bus;
    a plurality of circuits; and
    a plurality of receivers coupled to the bus to receive the clock signal for the plurality of circuits respectively;
    wherein each of the receivers having an impedance less than 200 ohms;
    wherein each of the receivers comprises a pair of current sources coupled to a pair of self-biased gates to receive the differential clock signal; and
    wherein the gates are biased via a common mode feedback circuitry based on outputs of the gates.

17. The apparatus of claim 16, wherein there is no inductor between the transmitter and the receivers; and the bus has no terminator.

* * * * *